(12) United States Patent
Shiizaki et al.

(10) Patent No.: US 9,445,416 B2
(45) Date of Patent: Sep. 13, 2016

(54) WIRELESS COMMUNICATION SYSTEM, BASE STATION, MOBILE STATION, AND WIRELESS COMMUNICATION METHOD

(71) Applicant: FUJITSU LIMITED, Kawasaki-shi, Kanagawa (JP)

(72) Inventors: Kotaro Shiizaki, Kawasaki (JP); Naoyuki Saito, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 248 days.

(21) Appl. No.: 14/156,629

(22) Filed: Jan. 16, 2014

(65) Prior Publication Data
US 2014/0133436 A1    May 15, 2014

Related U.S. Application Data

(63) Continuation of application No. PCT/JP2011/068532, filed on Aug. 15, 2011.

(51) Int. Cl.
*H04W 72/04* (2009.01)
*H04W 72/12* (2009.01)

(52) U.S. Cl.
CPC ..... *H04W 72/0426* (2013.01); *H04W 72/1284* (2013.01); *H04W 72/1221* (2013.01)

(58) Field of Classification Search
CPC ........... H04W 72/04; H04W 72/0426; H04W 72/1284; H04W 72/1221; H04W 72/0406; H04W 72/042; H04W 72/1205
See application file for complete search history.

(56) References Cited

U.S. PATENT DOCUMENTS

2007/0070894 A1*  3/2007  Wang ................ H04W 72/1242
                                                              370/230
2008/0232333 A1   9/2008  Jeong et al.
(Continued)

FOREIGN PATENT DOCUMENTS

JP     2009-159346     7/2009
JP     2010-518733     5/2010

OTHER PUBLICATIONS

3GPP TS 36.321, V10.2.0, [online], Jun. 2011, 3rd Generation Partnership Project; Technical Specification Group Radio Access Network; Evolved Universl Terrestrial Radio Access (E-UTRA); Medium Access Control (MAC) protocol specification (Release 10), pp. 25-27, [retrieved on Aug. 26, 2011], Retrieved from the Internet: <URL:http://www.3gpp.org/ftp/Specs/archive/36_series/36.321/36321-a20.zip>.

(Continued)

*Primary Examiner* — Paul H Masur
*Assistant Examiner* — Kabir Jahangir
(74) *Attorney, Agent, or Firm* — Fujitsu Patent Center

(57) ABSTRACT

A base station sends, to a mobile station, first resource allocation information in accordance with a scheduling request from the mobile station. Furthermore, the base station sends, to the mobile station, second resource allocation information based on the buffer status that is reported from the mobile station by using the first resource allocation information. The base station includes a receiving unit and a processor. The receiving unit receives data sent from the mobile station by using the second resource allocation information. When the processor receives a scheduling request from the mobile station before the completion of the reception of data by an amount indicated by the buffer status reported from the mobile station and when a predetermined condition is satisfied, the processor performs control such that the processor sends the second resource allocation information to the mobile station without sending the first resource allocation information.

6 Claims, 13 Drawing Sheets

(56) References Cited

U.S. PATENT DOCUMENTS

| | | | |
|---|---|---|---|
| 2009/0168714 A1 | 7/2009 | Tanaka et al. | |
| 2009/0270094 A1* | 10/2009 | Ito | H04W 56/0045 455/434 |
| 2010/0077100 A1* | 3/2010 | Hsu | H04W 72/1221 709/234 |
| 2010/0296472 A1* | 11/2010 | Lee, II | H04L 1/0026 370/329 |
| 2011/0188422 A1* | 8/2011 | Ostergaard | H04W 72/1284 370/311 |
| 2012/0076104 A1* | 3/2012 | Chun | H04W 72/042 370/329 |
| 2012/0100864 A1* | 4/2012 | Susitaival | H04W 72/1284 455/450 |
| 2012/0176984 A1* | 7/2012 | Susitaival | H04W 72/1284 370/329 |
| 2012/0269154 A1* | 10/2012 | Wang | H04W 72/1242 370/329 |
| 2012/0327799 A1* | 12/2012 | Sandlund | H04W 72/1221 370/252 |

OTHER PUBLICATIONS

TSG-RAN WG2 #63, R2-084314, 3GPP, [online], Aug. 18, 2008, [retrieved on Aug. 26, 2011], Research in Motion, Ltd., Reliability Analysis of UL SPS Activation Signalling, Retrieved from the Internet: <http://www.3gpp.org/ftp/tsg_ran/G2_RL2/TSGR2_63/Docs/R2-084314.zip>.

International Search Report, mailed in connection with PCT/JP2011/068532 and mailed Sep. 6, 2011.

* cited by examiner

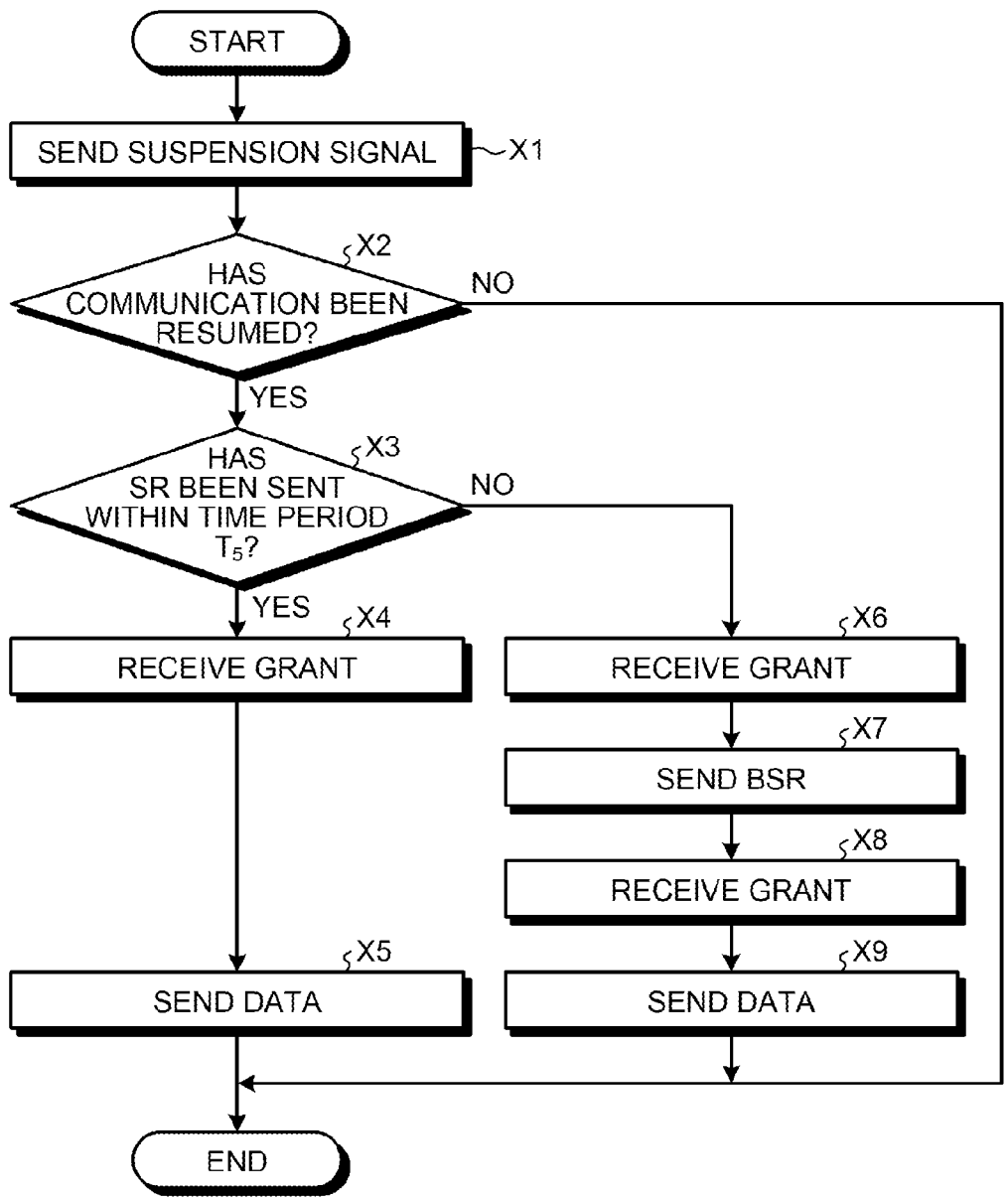

WIRELESS COMMUNICATION SYSTEM, BASE STATION, MOBILE STATION, AND WIRELESS COMMUNICATION METHOD

CROSS-REFERENCE TO RELATED APPLICATION

This application is a continuation of International Application No. PCT/JP2011/068532 filed on Aug. 15, 2011 and designating the U.S., the entire contents of which are incorporated herein by reference.

FIELD

The embodiments discussed herein are related to a wireless communication system, a base station, a mobile station, and a wireless communication method.

BACKGROUND

In a conventional wireless communication system in which mobile stations send and receive data to and from base stations, when a mobile station sends data to a base station, the mobile station requests scheduling from the base station before the mobile station sends the data. For example, in data transmission using a physical uplink shared channel (PUSCH), first, a mobile station sends a scheduling request (SR) and then requests the base station to allocate the communication resources. The base station sends back a Grant that indicates authorization of the request and then notifies the mobile station of authorization of the allocation. The mobile station that has received the notification sends a buffer status report (BSR) to the base station, whereby the mobile station notifies the base station of the volume of the data to be sent. If the base station permits the data to be received, the base station sends back a Grant to the mobile station, whereby the base station notifies the mobile station that the data transmission is permitted. When the mobile station receives the Grant, the mobile station enters a state in which the station can use a PUSCH to perform the data transmission.

In the series of the processes described above, because there is a need to calculate the volume of data to be transmitted both when the BSR is transmitted and when the Grant with respect to the BSR is sent back, the processes take a relatively long time (for example, 8 ms). In particular, when the volume of data is small or when data transmission is resumed after a transmission is temporarily suspended, because the percentage of the BSR transmission time with respect to the communication time (approx. 40 ms) is high, this time period results in the occurrence of a transmission delay. There is a known technology for reducing this delay factor. In this known technology a base station retains therein, in an associated manner, the reception timing of an SR and a BSR and then specifies a BSR from the time at which the SR is received, whereby the process for sending and receiving the BSR is eliminated.

Patent Document 1: Japanese National Publication of International Patent Application No. 2010-518733

However, with the technology described above, because an SR with a specific timing is associated with a BSR, it is conceivable to perform signaling on a higher layer, such as layer 1. Furthermore, when the base station detects the BSR described above, in addition to a usual (initial) SR, the base station receives, from the mobile station, another SR that is used to specify the BSR. Consequently, the transmission time period of the SR that is sent from the mobile station becomes long and thus the delay time may sometimes increase. For example, when the transmission time period of an SR is 20 ms and the amount of resources for the SRs is that corresponding to 200 mobile stations, if all of the mobile stations send, in addition to the usual SRs, another SR that is needed to specify a BSR, the amount of the resources consumed for the SRs increases by a factor of two. Consequently, the amount of the resources for the SRs corresponding to 200 mobile stations is decreased to an amount corresponding to 100 mobile stations. Thus, in order to reserve, as before, the resources for the SRs by an amount corresponding to 200 mobile stations, the wireless communication system changes the transmission time period of the SR from 20 ms to 40 ms. Consequently, the transmission delay time for each mobile station increases by 20 ms (=40-20 ms).

SUMMARY

According to an aspect of the embodiments, a wireless communication system includes a base station and a mobile station. The base station sends, to a mobile station in accordance with a scheduling request sent from the mobile station, first resource allocation information and sends, to the mobile station based on a buffer status reported from the mobile station by using the first resource allocation information, second resource allocation information. The mobile station sends, to the base station, data by using the second resource allocation information. The base station includes a receiving unit and a processor. The receiving unit receives the data sent from the mobile station by using the second resource allocation information. The processor performs control, when the scheduling request is received from the mobile station before the completion of the reception of data by an amount indicated by the buffer status that is reported from the mobile station and when a predetermined condition is satisfied, such that the second resource allocation information is sent to the mobile station without sending the first resource allocation information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a flowchart illustrating the operation of the mobile station according to modification 2.

DESCRIPTION OF EMBODIMENTS

Preferred embodiments will be explained with reference to accompanying drawings. The wireless communication system, the base station, the mobile station, and the wireless communication method disclosed in the present invention are not limited to the embodiments described below.

[a] First Embodiment

Figure 1:
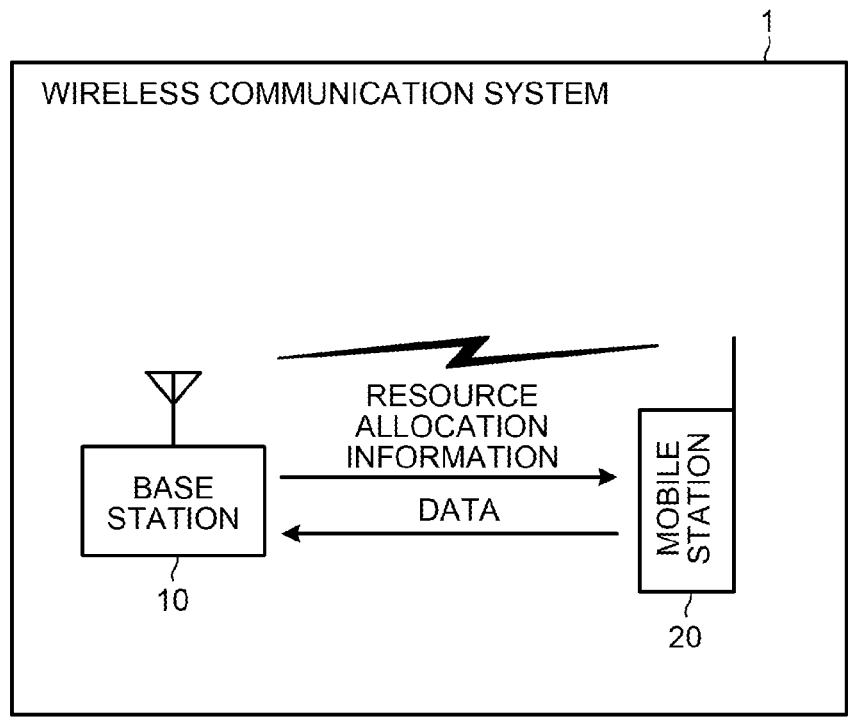
FIG. 1 is a schematic diagram illustrating the configuration of a wireless communication system.

FIG. 1 is a schematic diagram illustrating the configuration of a wireless communication system 1. As illustrated in FIG. 1, the wireless communication system 1 includes a base station 10 and a mobile station 20. The base station 10 and the mobile station 20 can send and receive various signals or data between each other via the wireless resource, which is used as a communication channel. Based on a scheduling request received from the mobile station 20, the base station 10 sends the first resource allocation information to the mobile station 20. Furthermore, based on a transmission buffer status (the BSR described above) reported by the mobile station 20 by using the first resource allocation information, the base station 10 sends the second resource allocation information to the mobile station 20. By using the second resource allocation information, the mobile station 20 sends data to the base station 10.

Figure 2:
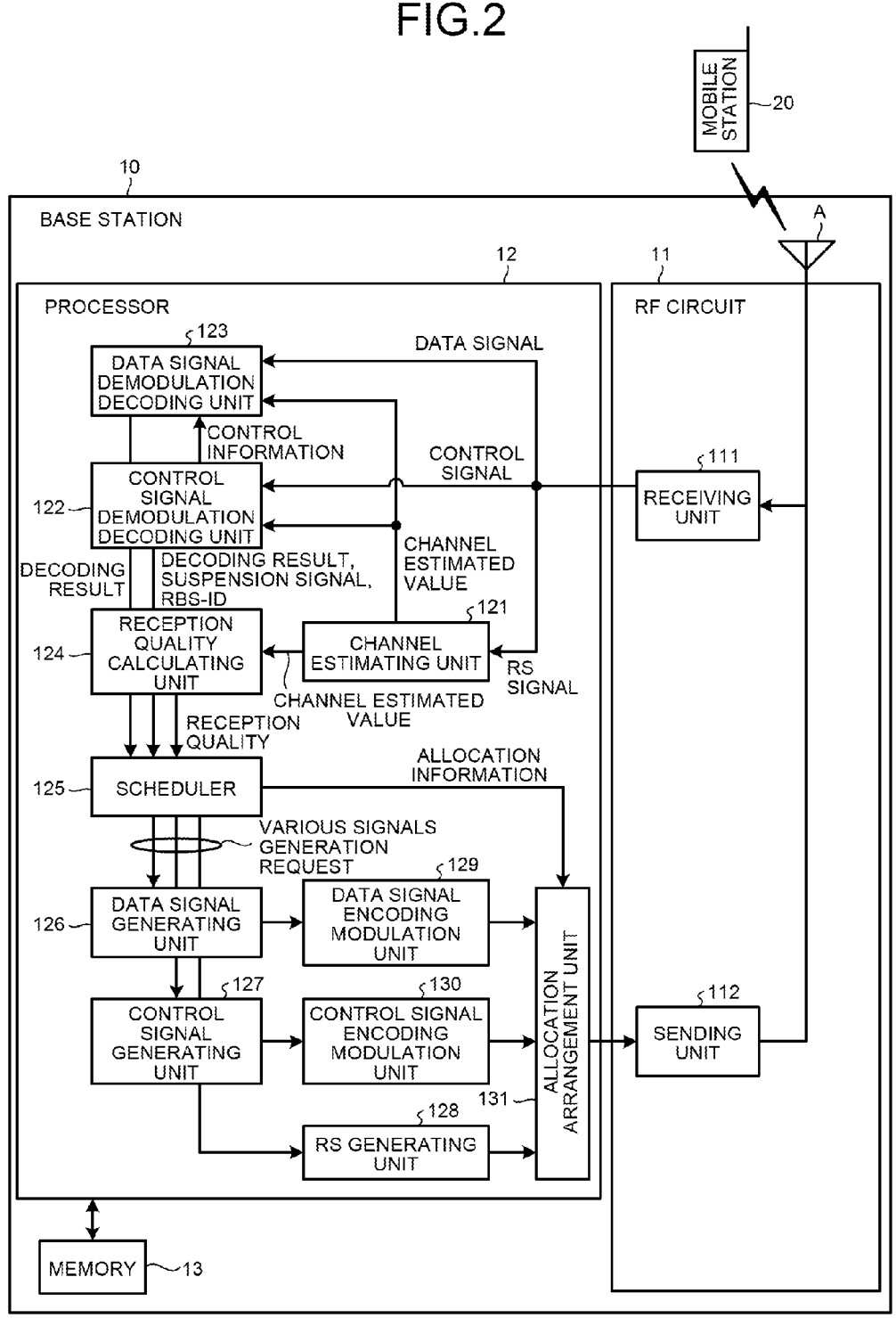
FIG. 2 is a schematic diagram illustrating the configuration of a base station according to a first embodiment.

FIG. 2 is a schematic diagram illustrating the configuration of the base station 10 according to the first embodiment. As illustrated in FIG. 2, the base station 10 includes, as hardware configuration components, a radio frequency (RF) circuit 11, a processor 12, and a memory 13. The RF circuit 11 includes, as functional configuration components, a receiving unit 111 and a sending unit 112. The processor 12 includes, as functional configuration components, a channel estimating unit 121, a control signal demodulation decoding unit 122, a data signal demodulation decoding unit 123, a reception quality calculating unit 124, and a scheduler 125. Furthermore, the processor 12 includes a data signal generating unit 126, a control signal generating unit 127, a reference symbol (RS) generating unit 128, a data signal encoding modulation unit 129, a control signal encoding modulation unit 130, and an allocation arrangement unit 131. Each of these units is connected such that a signal or data can be input and output in a one-way or two-way direction.

The receiving unit 111 receives, through a PUSCH or a physical uplink control channel (PUCCH), a signal in the uplink direction. The signal in the uplink direction includes, for example, an SR that is a scheduling request from the mobile station 20, a BSR that indicates the buffer size of data, a suspension signal that is sent to the base station 10 as notification indicating that communication with the base station 10 is to be suspended, and data that is targeted for transmission. The sending unit 112 sends a signal in the downlink direction by using a physical downlink control channel (PDCCH). The signal in the downlink direction includes, for example, information that is used to allocate, to the mobile station 20, the resources for the BSR transmission and also includes, for example, information that is used to allocate, to the mobile station 20, the resources for data transmission.

The channel estimating unit 121 extracts an RS signal from the signal received by the receiving unit 111 and then calculates a channel estimated value by using the RS signal. The control signal demodulation decoding unit 122 extracts a control signal from the signal that is received by the receiving unit 111 and then demodulates and decodes the control signal by using the channel estimated value described above. Furthermore, after the decoding, when the control signal demodulation decoding unit 122 detects a suspension signal, the control signal demodulation decoding unit 122 outputs the suspension signal to the scheduler 125 together with the radio base station (RBS)-ID that identifies the mobile station that is the transmission source of the suspension signal. The data signal demodulation decoding unit 123 extracts a data signal from the signal received by the receiving unit 111 and then demodulates and decodes the data signal by using both the control signal and the channel estimated value described above. The decoded control signal and the decoded data signal are output to the scheduler 125, which will be described later. The reception quality calculating unit 124 calculates, based on the channel estimated value calculated by the channel estimating unit 121, the reception radio wave intensity or the signal to interference ratio (SIR) and then outputs the calculated result as the reception quality to the scheduler 125.

The scheduler 125 requests the generation of various signals when the scheduler 125 receives the following inputs: decoding result, the suspension signal, and the RBS-ID, which were all input from the control signal demodulation decoding unit 122; an input of the decoding result, which was input from the data signal demodulation decoding unit 123; and an input of the reception quality, which was input from the reception quality calculating unit 124. Specifically, the scheduler 125 requests the data signal generating unit 126 to generate a data signal, requests the control signal generating unit 127 to generate a control signal, and requests the RS generating unit 128 to generate an RS. Furthermore, the scheduler 125 outputs, to the allocation arrangement unit 131, which will be described later, allocation information that is used to specify the resource that is to be allocated to the signal that is targeted for transmission.

Each of the generating units, i.e., the data signal generating unit 126, the control signal generating unit 127, and the RS generating unit 128, generates a signal in accordance with the request from the scheduler 125. The data signal encoding modulation unit 129 encodes and modulates the data signal that is input from the data signal generating unit 126 in the format that is available for the wireless transmission and then outputs the signal to the allocation arrangement unit 131. The control signal encoding modulation unit 130 encodes and modulates the control signal that is input from the control signal generating unit 127 in the format that is available for the wireless transmission and then outputs the signal to the allocation arrangement unit 131. Based on the allocation information described above, the allocation arrangement unit 131 allocates the resources for transmission channels to the data signal that is encoded and modulated by the data signal encoding modulation unit 129; to the control signal that is encoded and modulated by the control signal encoding modulation unit 130; and to the signal that is generated by the RS generating unit 128.

Figure 3:
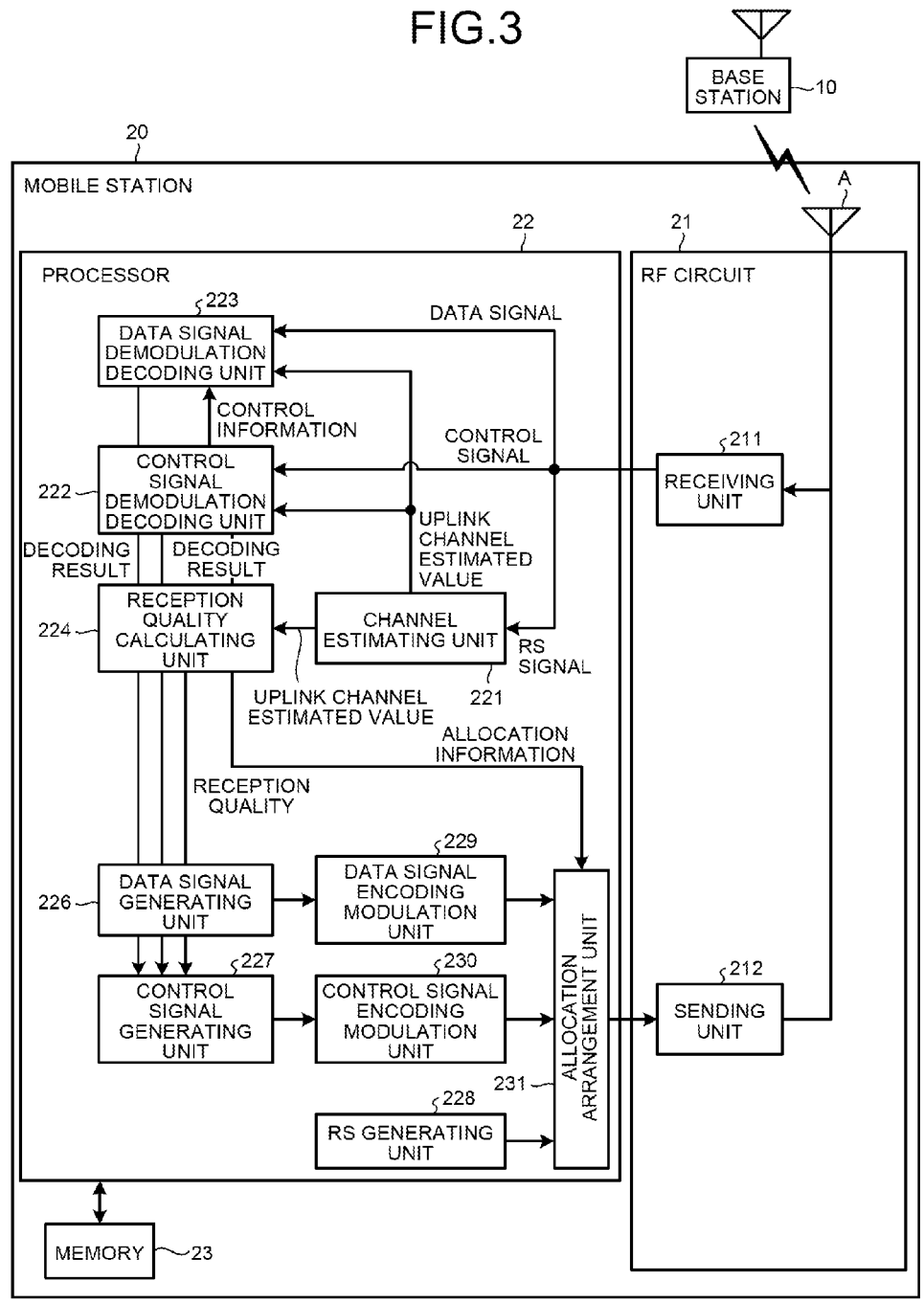
FIG. 3 is a schematic diagram illustrating the configuration of a mobile station according to the first embodiment.

FIG. 3 is a schematic diagram illustrating the configuration of the mobile station 20 according to the first embodiment. As illustrated in FIG. 3, the configuration of the mobile station 20 is the same as that of the base station 10 illustrated in FIG. 2, except that the mobile station 20 does not include a scheduler. Accordingly, components having the same configuration are assigned reference numerals with the same last numbers and the descriptions of such components in detail are omitted. The mobile station 20 includes, as hardware configuration components, an RF circuit 21, a processor 22, and a memory 23. Because the mobile station 20 does not include a scheduler, the decoding result that is output from a data signal demodulation decoding unit 223 is directly input to a control signal generating unit 227. Similarly, the decoding result that is output from a control signal demodulation decoding unit 222 is directly input to the control signal generating unit 227. Furthermore, the reception quality that is calculated by a reception quality calculating unit 224 is also input to the control signal generating unit 227.

The RF circuits 11 and 21 are made up of, for example, a digital-to-analog converter (DAC)/analog-to-digital converter (ADC), a frequency converter, or an antenna A. The processors 12 and 22 are made up of, for example, a central processing unit (CPU), a field programmable gate array (FPGA), or a digital signal processor (DSP). The memories 13 and 23 are made up of, for example, a RAM, such as a synchronous dynamic random access memory (SDRAM), a read only memory (ROM), or a flash memory.

In the following, the operation of the wireless communication system 1 according to the first embodiment will be described.

Figure 4:
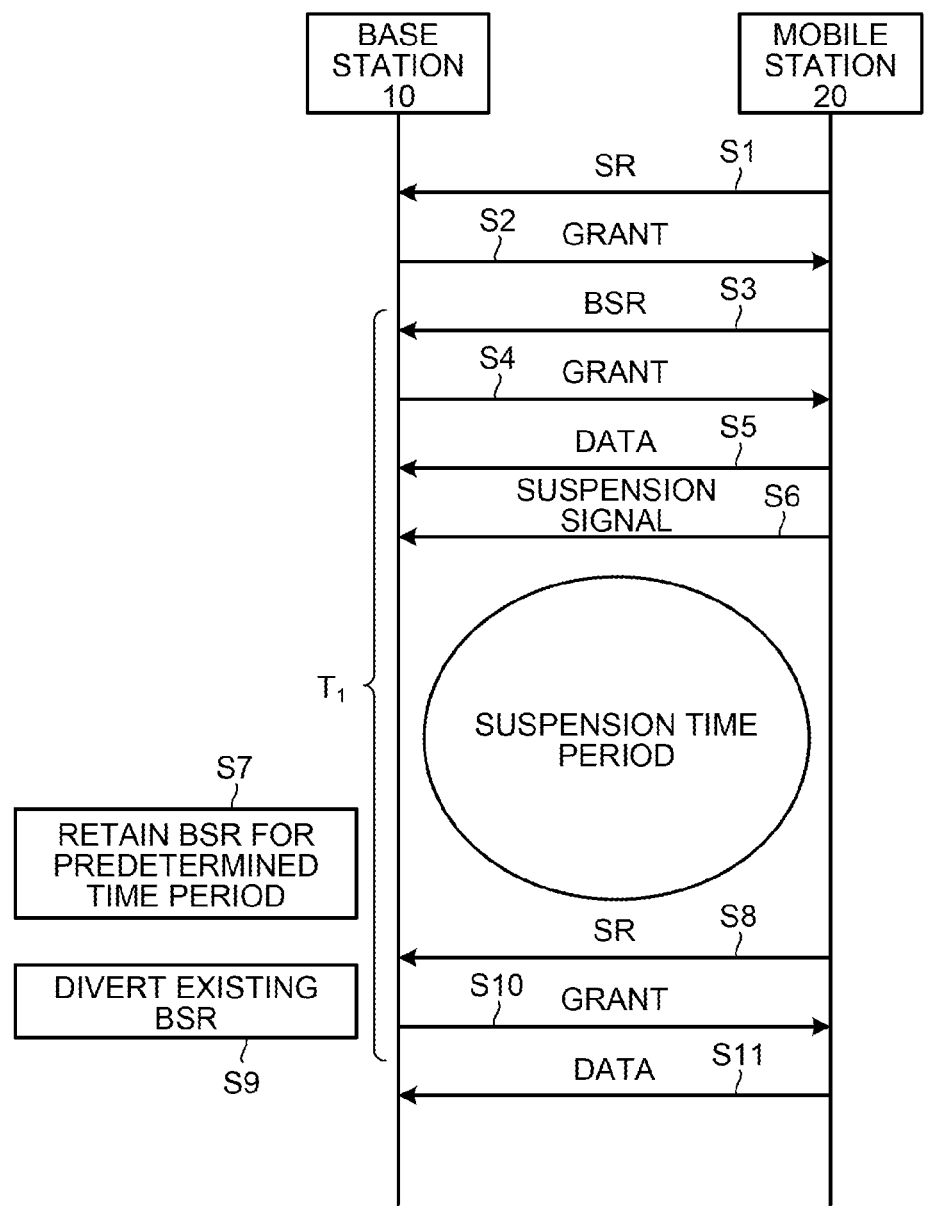
FIG. 4 is a schematic diagram illustrating the operation of the base station and the mobile station according to the first embodiment.

FIG. 4 is a schematic diagram illustrating the operation of the base station 10 and the mobile station 20 according to the first embodiment. At Step S1, by sending a scheduling request (SR), the mobile station 20 requests the base station 10 to allocate communication resources. The base station 10 sends back a Grant that indicates a permission is given with respect to the request and then notifies the mobile station 20 that the allocation is permitted (Step S2). The mobile station 20 that received the notification sends a buffer status report (BSR) to the base station 10, thereby notifying the base station 10 of the amount of data to be sent (Step S3). When the base station 10 permits receiving of the data, the base station 10 again sends back a Grant to the mobile station, thereby notifying the mobile station 20 that the data transmission is permitted (Step S4). A PDCCH is used for the Grant that is sent from the base station 10 to the mobile station 20.

When the mobile station 20 receives the Grant, the mobile station 20 enters a state in which the mobile station 20 can perform data transmission by using the PUSCH and then the data transmission from the mobile station 20 to the base station 10 is started (Step S5). During the data transmission at Step S5, when the mobile station 20 suspends the data transmission even though the data transmission has not been completed, the mobile station 20 sends a suspension signal to the base station (Step S6). The trigger to send the suspension signal is not limited to a transmission suspension process that is spontaneously performed by the mobile station 20 due to degradation of the communication environment. The trigger may also be a suspension process that is forcedly and manually performed by a user.

Figure 5:
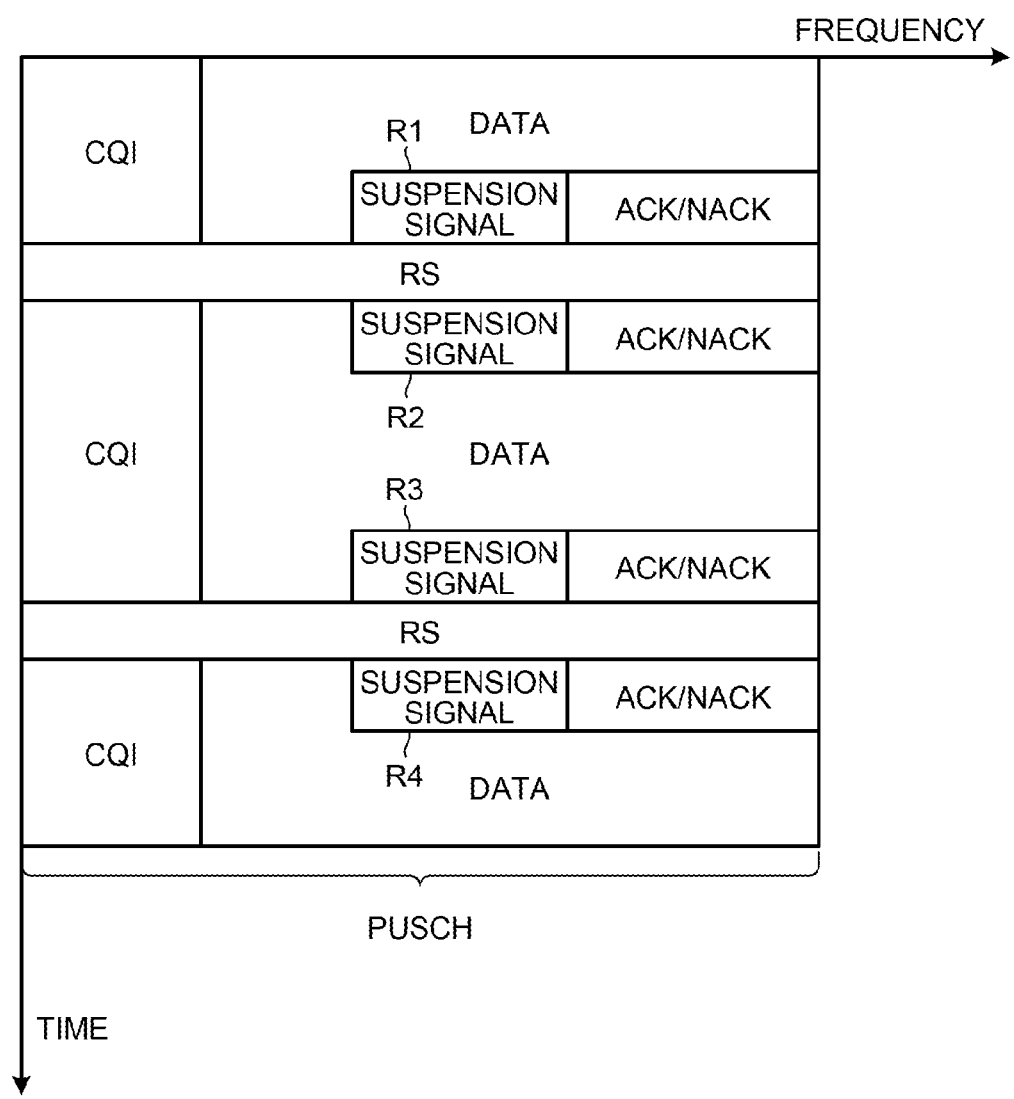
FIG. 5 is a schematic diagram illustrating an arrangement example of suspension signals in a PUSCH that is used for data transmission from the mobile station to the base station.

In the following, the arrangement of the suspension signals that are sent and received at Step S6 will be described. FIG. 5 is a schematic diagram illustrating an arrangement example of suspension signals in a PUSCH that is used for data transmission from the mobile station to the base station. In FIG. 5, the frequency is represented in the X-axis direction and the time is represented in the y-axis direction. As illustrated in FIG. 5, in the PUSCH, suspension signals R1 to R4 are arranged such that the suspension signals R1 to R4 are adjacent to the ACK/NACK in the frequency direction and are adjacent to the RSs in the time axis direction. The mobile station 20 maps each of the suspension signals R1 to R4 on a portion near an RS that is a pilot signal, whereby the base station 10 can easily estimate the channel by using the pilot signal.

At Step S6, when the base station 10 receives the suspension signal, the base station 10 stops the scheduling with respect to the mobile station 20; determines that the mobile station 20 is not targeted for the allocation of the resources; and retains the BSR that was received at Step S3 for a predetermined time period (Step S7). The predetermined time period differs depending on the amount of data indicated by the BSR or the number of mobile stations that can be accommodated by the base station 10; however, for example, a few minutes to tens of minutes is sufficient. The BSR is discarded after the predetermined time period has elapsed. Furthermore, because the base station 10 stops the scheduling with respect to the mobile station 20 in accordance with the transmission suspension request from the mobile station 20, after that, the mobile station 20 is excluded from being a target for the allocation of a channel. This makes it possible to reduce the waste of resources and thus it is possible to efficiently use the resources with respect to mobile stations other than the mobile station 20.

After the suspension time period is ended, i.e., when the communication is resumed, and before the predetermined time period elapses, if the base station 10 again receives an SR from the mobile station 20 (Step S8), the base station 10 diverts the BSR retained at Step S7 (Step S9) and then sends a Grant with respect to the mobile station 20 based on the BSR retained at Step S7 BSR. At this point, the Grant that requests transmission of the BSR, i.e., the Grant that was sent and received at Step S2, is not sent. Instead, the Grant that permits transmission of the data, i.e., the Grant that was sent and received at Step S4, is sent. Consequently, the base station 10 skips the process of receiving the BSR and then allocates the resources for the mobile station 20 (Step S10). Then, the mobile station 20 sends data, via the PUSCH, by using the resources allocated at Step S10 (Step S11).

Figure 6:
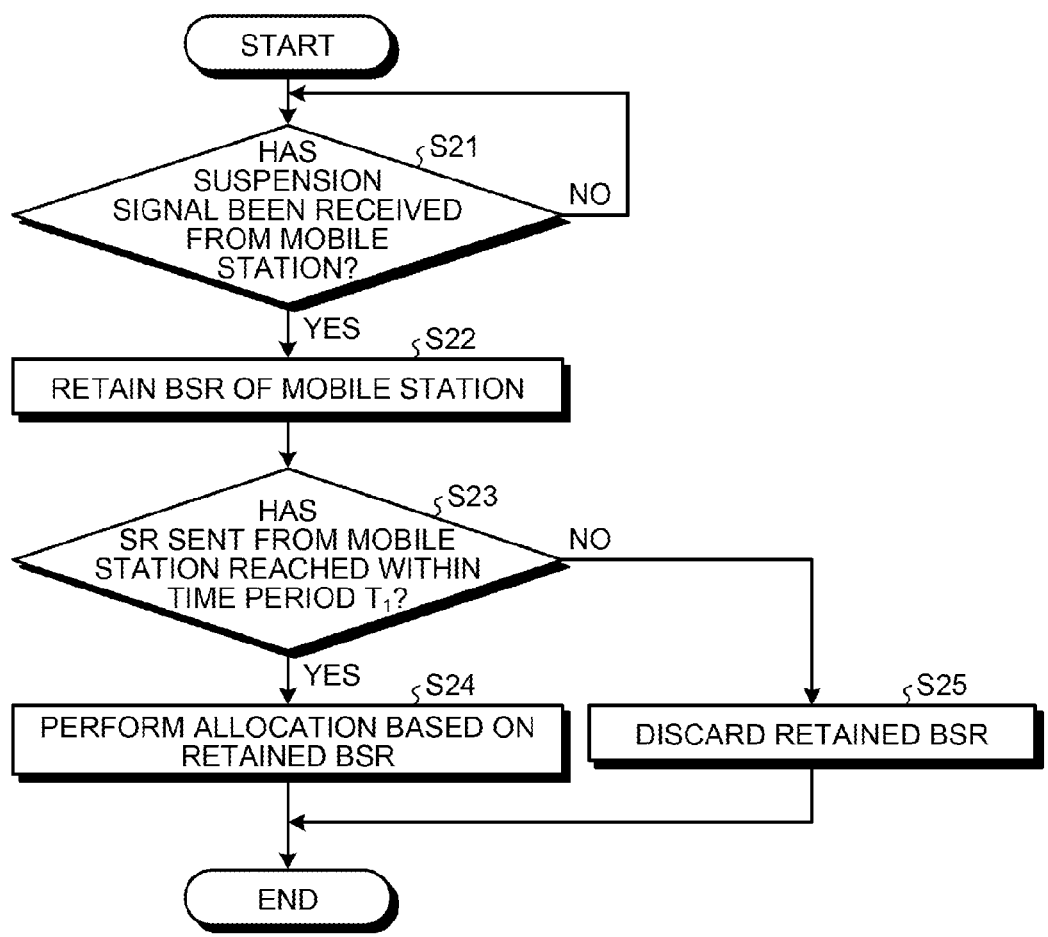
FIG. 6 is a flowchart illustrating the operation of the base station according to the first embodiment.

FIG. 6 is a flowchart illustrating the operation of the base station 10 according to the first embodiment. The base station 10 waits for a suspension signal to be received from the mobile station 20 (Step S21). Thus, even if the base station 10 receives a suspension signal (Yes at Step S21), the base station 10 retains, without discarding, the BSR for the mobile station 20 that was immediately previously received (Step S22). Before a predetermined time period $T_1$ has elapsed after the reception of the BSR, when the SR sent from the mobile station 20 reaches the base station 10 (Yes at Step S23), the base station 10 allocates, based on the BSR retained at Step S22, the resources for the mobile station 20 transmitting the data (Step S24). In contrast, at Step S23 described above, when the predetermined time period $T_1$ has elapsed (No Step S23) before the SR sent from the mobile station 20 reaches its destination, the base station 10 discards the BSR that was retained at Step S22 (Step S25).

As described above, the wireless communication system 1 according to the first embodiment includes the base station 10 and the mobile station 20. In accordance with a scheduling request (for example, an SR at Step S1) received from the mobile station 20, the base station 10 sends the first resource allocation information (for example, the Grant at Step S2) to the mobile station 20. Furthermore, based on the buffer status (for example, the BSR at Step S3) reported from the mobile station 20 by using the first resource allocation information, the base station 10 sends the second resource allocation information (for example, the Grant at Step S4) to the mobile station. The mobile station 20 sends data by using the second resource allocation information. The base station 10 includes the receiving unit 111 and the processor 12. The receiving unit 111 receives the data that is sent from the mobile station 20 by using the second resource allocation information. If the processor 12 receives the scheduling request (for example, the SR at Step S8) from the mobile station 20 before the completion of the reception of data by the amount indicated by the buffer status that was reported from the mobile station 20 and if a predetermined condition is satisfied, the processor 12 controls transmission such that the second resource allocation information (for example, the Grant at Step S10) is sent to the mobile station 20 without sending the first resource allocation information (for example, the Grant at Step S2).

The mobile station 20 according to the first embodiment sends a scheduling request to the base station 10 Then, in accordance with the scheduling request, the mobile station 20 reports its own buffer status to the base station 10 by using the first resource allocation information that is sent from the base station 10. Furthermore, based on the buffer status, the mobile station 20 sends data by using the second resource allocation information that is sent from the base station 10. The mobile station 20 includes a receiving unit 211. If the scheduling request is received after the base station 10 has received a predetermined signal (for example, a suspension signal), the receiving unit 211 receives the second resource allocation information that is sent from the base station 10 in accordance with the scheduling request.

Before receiving the suspension signal, the base station 10 retains the BSR that is previously reported and, when communication is resumed, the base station 10 allocates, by using the BSR, the resources for the mobile station 20. Consequently, the mobile station 20 does not need to send the BSR when the communication is resumed, whereby the process due to this transmission can be omitted, and thus any delay time can be reduced. Furthermore, at this point, new signaling does not need to be performed on a higher layer, thus preventing the resources from being wasted. Consequently, it is possible to provide a wireless communication system with a low delay while the consumption of the wireless resources is reduced.

[b] Second Embodiment

Figure 7:
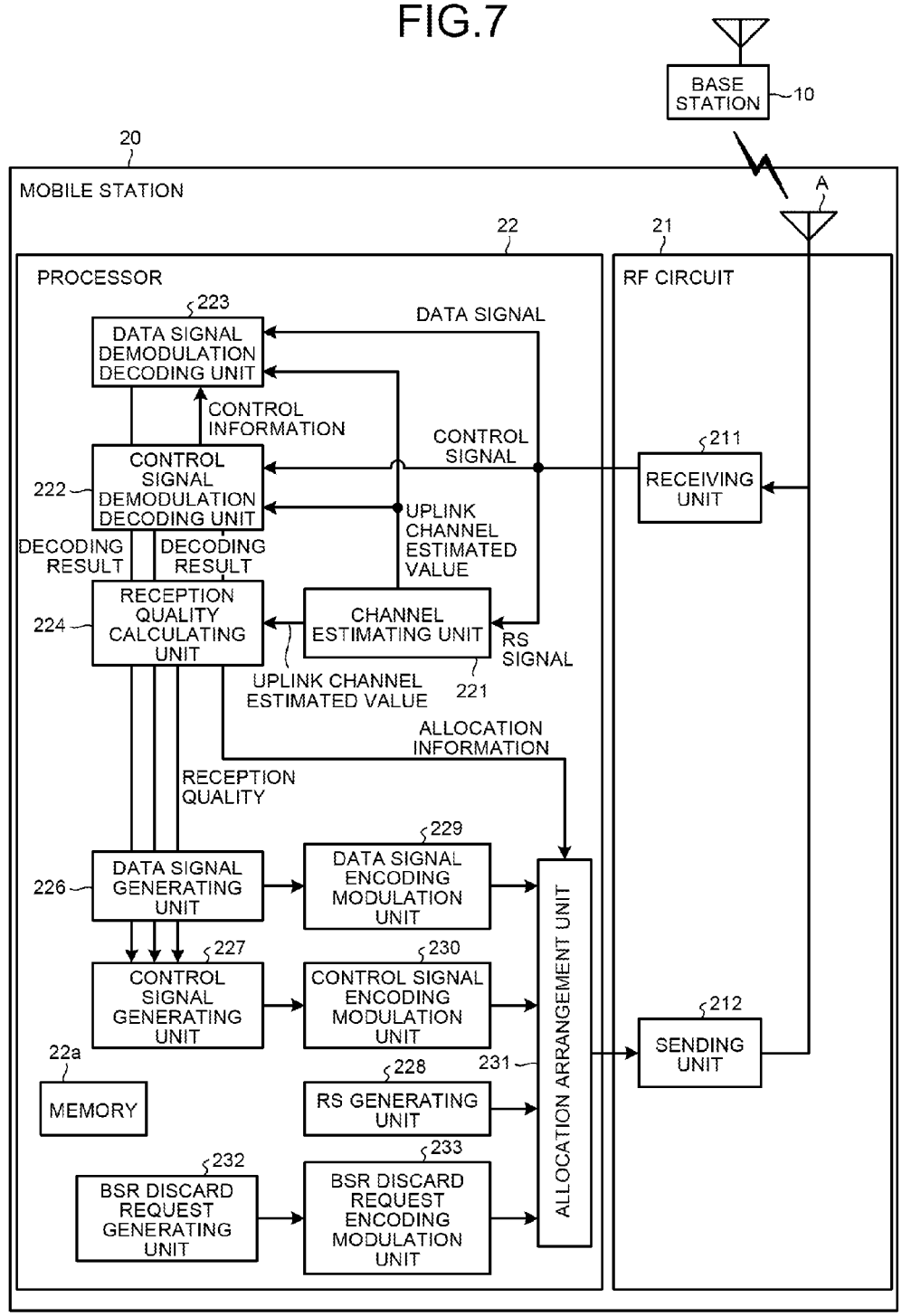
FIG. 7 is a schematic diagram illustrating the configuration of a mobile station according to a second embodiment.

In the following, a second embodiment will be described. The configuration of the wireless communication system according to the second embodiment is the same as that according the first embodiment illustrated in FIG. 1. Furthermore, the configuration of the base station according to the second embodiment is the same as that according to the first embodiment illustrated in FIG. 2. Furthermore, as illustrated in FIG. 7, the configuration of the mobile station according to the second embodiment is the same as that according to the first embodiment illustrated in FIG. 3, except that a BSR discard request generating unit 232 and a BSR discard request encoding modulation unit 233 are included. Accordingly, in the second embodiment, components having the same configuration as those in the first embodiment are assigned the same reference numerals and descriptions of such components in detail are omitted. The second embodiment differs from the first embodiment in that the base station 10 discards, in accordance with a request from the mobile station 20, the retained BSR. Specifically, in the first embodiment, a BSR is discarded after a predetermined time period has elapsed. In contrast, in the second embodiment, if a request is received from the mobile station 20 without waiting for the elapsed time of the predetermined time period, the BSR is discarded. In the following, the operation of the base station 10 and the mobile station 20 according to the second embodiment will be described with reference to FIG. 8 and will concentrate on the differences between the first embodiment and the second embodiment.

Figure 8:
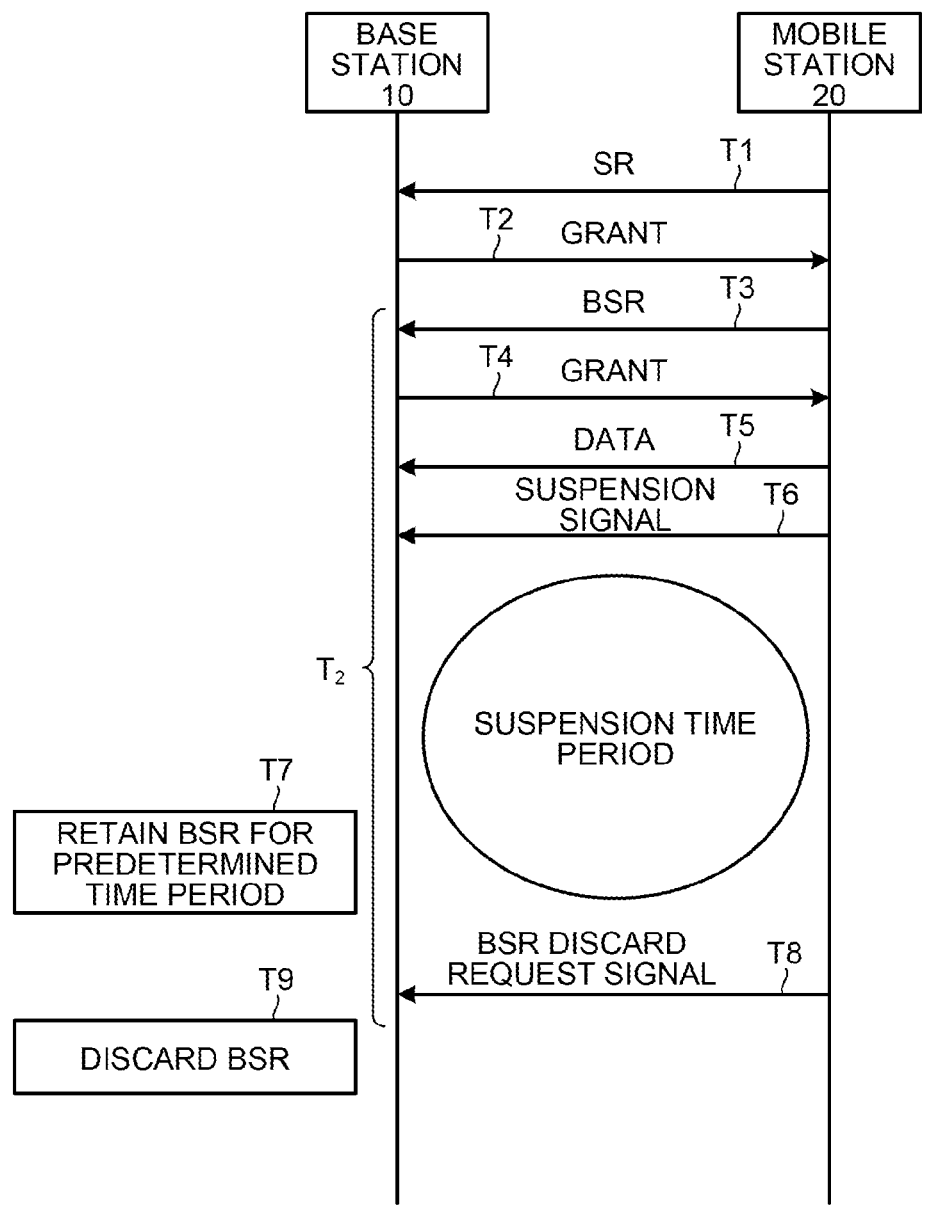
FIG. 8 is a schematic diagram illustrating the operation of a base station and the mobile station according to the second embodiment.

FIG. 8 is a schematic diagram illustrating the operation of the base station 10 and the mobile station 20 according to the second embodiment. Because the operation illustrated in FIG. 8 is the same as that in the first embodiment illustrated in FIG. 4, except for the processes performed at Steps T8 and T9, processes performed at the same steps are assigned reference numerals with the same last numbers and descriptions of such process in detail are omitted. Specifically, Steps T1 to T7 illustrated in FIG. 8 correspond to Steps S1 to S7 illustrated in FIG. 4.

At Step T8 illustrated in FIG. 8, the BSR discard request generating unit 232 in the mobile station 20 generates a BSR discard request signal that requests the base station 10 to discard the BSR of the mobile station 20. Then, the BSR discard request encoding modulation unit 233 encodes and modulates the BSR discard request signal that is generated by the BSR discard request generating unit 232 in the format that is available for wireless communication via a PUSCH and then outputs the signal to a sending unit 212 via an allocation arrangement unit 231. The sending unit 212 sends the BSR discard request signal to the base station 10 as the destination. At Step T9, the base station 10 discards the BSR in response to the BSR discard request signal. The trigger to send the BSR discard request signal is, for example, when an instruction is input by a user; however, the mobile station 20 may also automatically send the BSR discard request signal after a predetermined time period (for example, a few minutes to tens of minutes) has elapsed.

As described above, with the wireless communication system 1 according to the second embodiment, when a request is received from the mobile station 20, the base station 10 performs control such that the BSR was previously retained is discarded even if it is before the predetermined time period has elapsed. Consequently, in addition to the advantages for the wireless communication system 1 according to the first embodiment, the mobile station 20 can spontaneously discard a BSR that may be less likely to be used. Thus, if a BSR is not used, such as when it is certain that a user will not resume a communication, it is possible to prevent the base station 10 from retaining a unused BSR and thus it is possible to prevent the waste of resources, such as the memory 13. Consequently, the resources are efficiently used.

The predetermined condition mentioned above is, for example, before a BSR is discarded, i.e., before the predetermined time period according to the first embodiment has elapsed or before a discard request is received from the mobile station 20 according to the second embodiment.

[c] Third Embodiment

In the following, a third embodiment will be described. The configuration of the wireless communication system according to the third embodiment is the same as that according to the first embodiment illustrated in FIG. 1. Furthermore, the configuration of the base station according to the third embodiment is the same as that according to the first embodiment illustrated in FIG. 2. Furthermore, the configuration of the mobile station according to the third embodiment is the same as that according to the first embodiment illustrated in FIG. 3. Accordingly, in the third embodiment, components having the same configuration as those in the first embodiment are assigned the same reference numerals and descriptions of such components in detail are omitted.

The third embodiment differs from the first embodiment in that the method performed by the base station 10 to allocate an RBS-ID (terminal ID). Specifically, in the first embodiment, when the base station 10 receives a suspension signal, the base station 10 temporarily releases the RBS-ID of the mobile station that has sent the suspension signal. In contrast, in the third embodiment, even if the base station 10 receives a suspension signal, the base station 10 protects the RBS-ID without releasing the RBS-ID. The "protection" mentioned in the third embodiment means that, once an RBS-ID is allocated to a mobile station, it is not allocated to (is not released to) another mobile station. In the following, the operation of the base station 10 according to the third embodiment will be described with reference to FIG. 9 and will concentrate on the differences between the first embodiment and the third embodiment.

Figure 9:
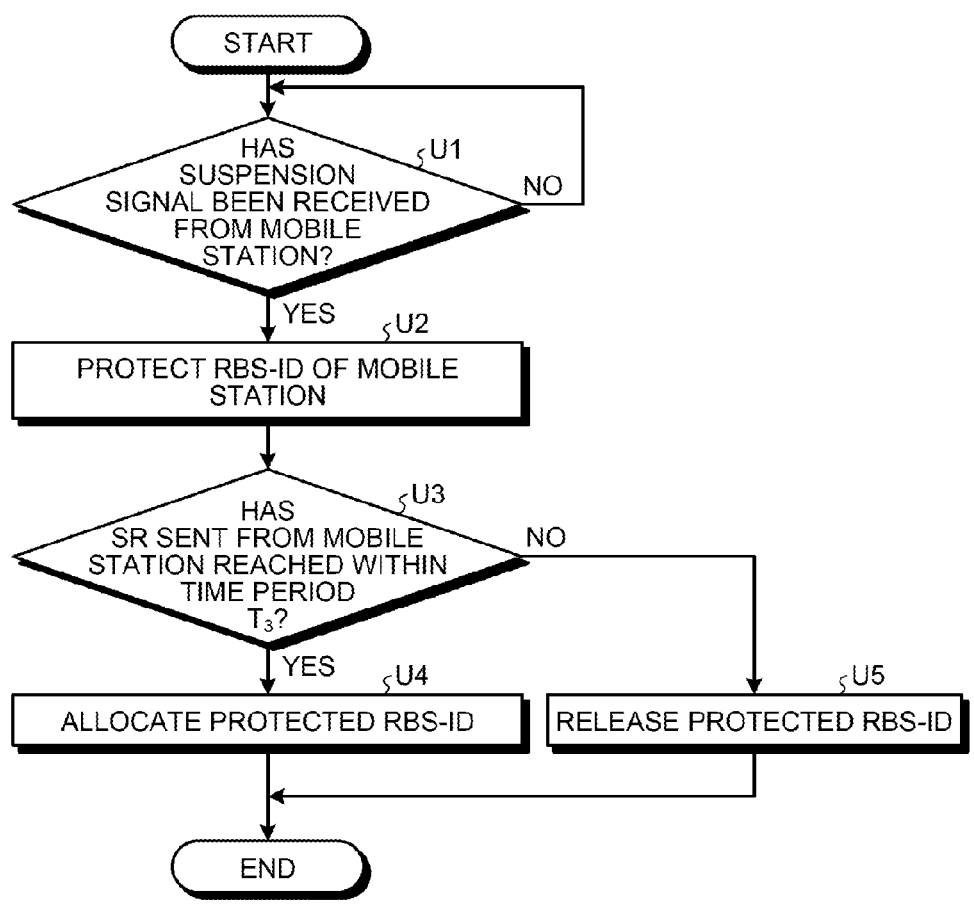
FIG. 9 is a flowchart illustrating the operation of a base station according to a third embodiment.

FIG. 9 is a flowchart illustrating the operation of the base station 10 according to the third embodiment. The base station 10 waits for a suspension signal from the mobile station 20 to be received (Step U1). Thus, even if the base station 10 receives the suspension signal (Yes at Step U1), the base station 10 protects the RBS-ID of the mobile station 20 without allocating the RBS-ID to another mobile station (Step U2). Before a predetermined time period $T_3$ has elapsed since the reception of the BSR, when the SR sent from the mobile station 20 reaches the base station 10 (Yes at Step U3), the base station 10 reallocates the RBS-ID that was protected at Step U2 to the mobile station 20 (Step U4). In contrast, at Step U3, when the predetermined time period $T_3$ has elapsed (No at Step U3) before the SR sent from the mobile station 20 reaches its destination, the base station 10 releases the RBS-ID that was protected at Step U2 (Step U5).

The base station 10 associates an RBS-ID with a BSR for each mobile station and manages them. Conventionally, when the base station 10 receives a suspension signal from a mobile station, the base station 10 temporarily releases the RBS-ID that has been allocated to the mobile station and then reallocates an RBS-ID to the mobile station when communication is resumed. Consequently, when communication is resumed, the released RBS-ID may possibly already have been allocated to another mobile station that was handed over by the base station 10. In such a case, before communication is suspended and after communication is resumed, different RBS-IDs are allocated to the mobile station even though the mobile station is actually the same terminal. Consequently, there may be a case where, after communication is resumed, the base station 10 is not able to refer to the BSR, which was retained before the suspension, as the BSR of the mobile station that has resumed the communication.

Accordingly, if there is at least a possibility that once a BSR is received it is then diverted, the base station 10 according to the third embodiment protects the RBS-ID that is associated with the target BSR. This makes it possible to prevent the mobile station ID from being inconsistent before and after the suspension of communication and thus avoiding the inconvenience described above. Consequently, even after communication is resumed, the base station 10 can also reliably refer to and use the BSR of the mobile station 20 that suspends communication. Thus, by diverting the BSR, it is possible to provide a wireless communication system with a low delay while the consumption of the wireless resource is more reliably reduced. Consequently, the reliability of the wireless communication system 1 is improved.

[d] Fourth Embodiment

In the following, a fourth embodiment will be described. The configuration of the wireless communication system according to the fourth embodiment is the same as that according to the first embodiment illustrated in FIG. 1. Furthermore, the configuration of the base station according to the fourth embodiment is the same as that according to the first embodiment illustrated in FIG. 2. Furthermore, the configuration of the mobile station according to the fourth embodiment is the same as that according to the first embodiment illustrated in FIG. 3. Accordingly, in the fourth embodiment, components having the same configuration as those in the first embodiment are assigned the same reference numerals and descriptions of such components in detail are omitted.

The fourth embodiment differs from the first embodiment in that the method of notifying a BSR. Specifically, in the first embodiment, the base station 10 retains a BSR that is received before the suspension of communication and then diverts the BSR after the communication is resumed. In contrast, in the fourth embodiment, the base station 10 does not retain a BSR. Instead, the mobile station 20 sends a BSR instead of an SR. In the following, the operation of the base station 10 and the mobile station 20 according to the fourth embodiment will be described with reference to FIGS. 10 and 11 and will concentrate on the differences between the first embodiment and the fourth embodiment.

Figure 10:
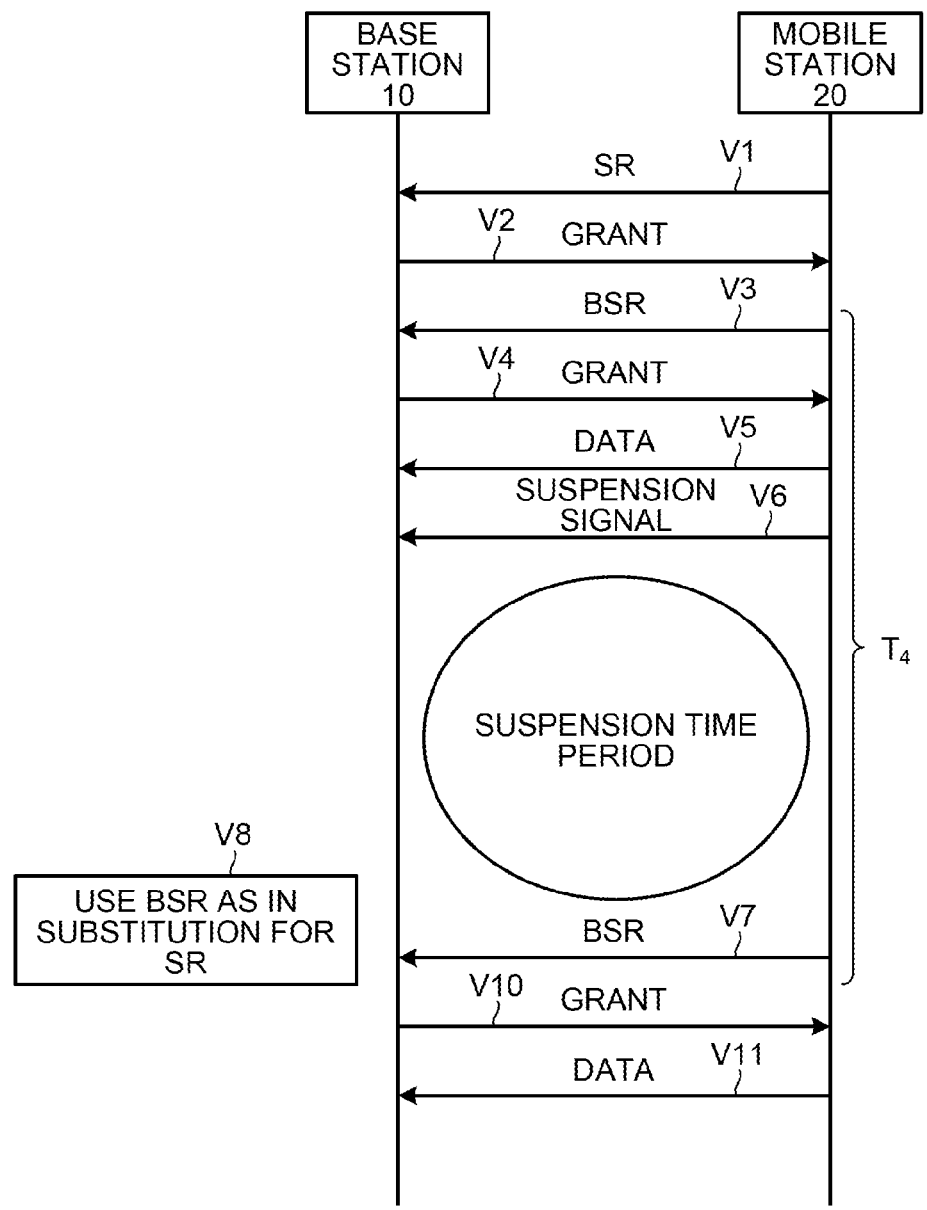
FIG. 10 is a schematic diagram illustrating the operation of a base station and a mobile station according to a fourth embodiment.

FIG. 10 is a schematic diagram illustrating the operation of the base station 10 and the mobile station 20 according to the fourth embodiment. Because the operation illustrated in FIG. 10 is the same as that in the first embodiment illustrated in FIG. 4, except for the processes performed at Steps V7 and V8, processes performed at the same steps are assigned reference numerals with the same last numbers and descriptions of such process in detail are omitted. Specifically, Steps V1 to V6, V10, and V11 illustrated in FIG. 10 correspond to Steps S1 to S6, S10, and S11 illustrated in FIG. 4.

At Step V7 illustrated in FIG. 10, after the resumption of the communication, the sending unit 212 in the mobile station 20 does not send, to the base station 10, an SR but sends a BSR. When the base station 10 receives the BSR by using the receiving unit 111, the base station 10 uses, by using the processor 12, the BSR as a substitute for an SR (Step V8).

Figure 11:
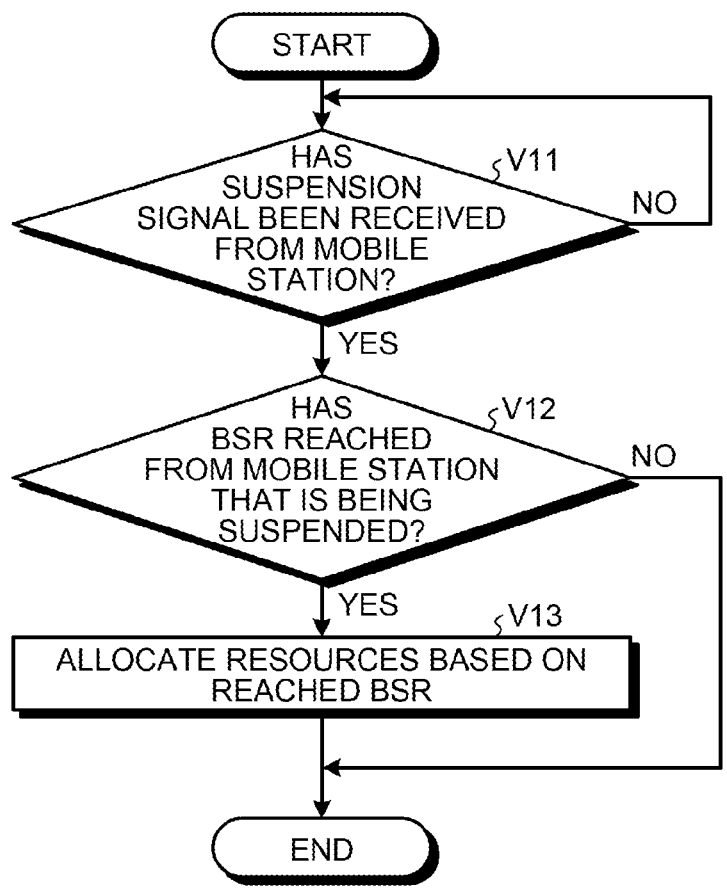
FIG. 11 is a flowchart illustrating the operation of the base station according to the fourth embodiment.

FIG. 11 is a flowchart illustrating the operation of the base station 10 according to the fourth embodiment. The base station 10 waits for a suspension signal from the mobile station 20 to be received (Step V11). When the base station 10 receives a suspension signal (Yes at Step V11), the base station 10 monitors the reaching of a BSR from the mobile station 20 that is the mobile station in which communication is being suspended (Step V12). When the base station 10 detects the reaching of the BSR due to the result of the monitoring (Yes at Step V12), the base station 10 allocates, based on the BSR, the resources to the mobile station 20 that is the transmission source of the BSR (Step V13). In contrast, if the base station 10 does not detect the reaching of the BSR in a predetermined time period $T_4$ since the previous BSR has been reached (Step V3 illustrated in FIG. 10) (No at Step V12), the base station 10 skips the process at Step V13.

As described above, the wireless communication system 1 according to the fourth embodiment includes the base station 10 and the mobile station 20. The mobile station 20 sends a scheduling request (for example, the SR at Step V1) to the base station 10 at a previously determined timing (for example, a time period of 20 ms). By using the first resource allocation information (for example, the Grant at Step V2) that is sent from the base station 10 in response to the scheduling request, the mobile station 20 reports its own buffer status (for example, the BSR at Step V3) to the base station 10. Based on the buffer status, the mobile station 20 sends data by using the second resource allocation information (for example, the Grant at Step V4) that is sent from the base station 10. If the mobile station 20 does not complete transmission of data, which corresponds to an amount indicated by the buffer status that was reported to the base station 10, by using the resources specified by the second resource allocation information, the mobile station 20 does not send a scheduling request (SR) to the base station 10, at a timing that is set in advance. Then, at this point, the processor 22 in the mobile station 20 performs control such that the buffer status (for example, the BSR at Step V7) of the mobile station 20 is reported.

In other words, when the communication is resumed after the suspension of the communication, the mobile station 20 sends a BSR instead of an SR and allows the BSR to share the function of the SR. When the base station 10 receives the BSR, without receiving the SR, from the mobile station 20 that has suspended communication, the base station 10 determines that, based on this receiving process, the mobile station 20 requests the resumption of communication with the base station 10. Then, the base station 10 sends back a Grant to the mobile station 20 and resumes allocating the resources based on the received BSR. Consequently, because the mobile station 20 can skip transmission of the SR when the communication is resumed, a delay time is reduced by the time period for which the transmission was skipped. Furthermore, at this point, new signaling does not need to be performed in a higher layer, and thus wasting of resources is prevented. Consequently, it is possible to provide a wireless communication system with a low delay while the consumption of the wireless resource is reduced. In addition, during the suspension of communication, the base station 10 does not need to continuously retain the previously received BSR. Thus, it is possible to save the resources, such as the memory 13 used for retaining the BSR. Consequently, the resource can be efficiently used.

The embodiment is not limited to the embodiments described above. For example, various modifications may also be used for the embodiments described above. In the following, modifications 1 and 2 will be described with reference to FIG. 12 and FIG. 13, respectively. In each of the embodiments described above, a description has been mainly given with the assumption that, when communication for data transmission is resumed after suspension of the communication, the mobile station 20 sends all the pieces of data including the data that has already been sent. However, in the first to the third embodiments, when the data transmission is resumed, the mobile station 20 may also send the remaining data (transmission data that has not been sent) without sending the data that has already been sent. In such a case, when the base station 10 diverts a BSR, the base station 10 subtracts the volume of received data from the received BSR and then calculates a BSR at the time of resumption of the communication.

Figure 12:
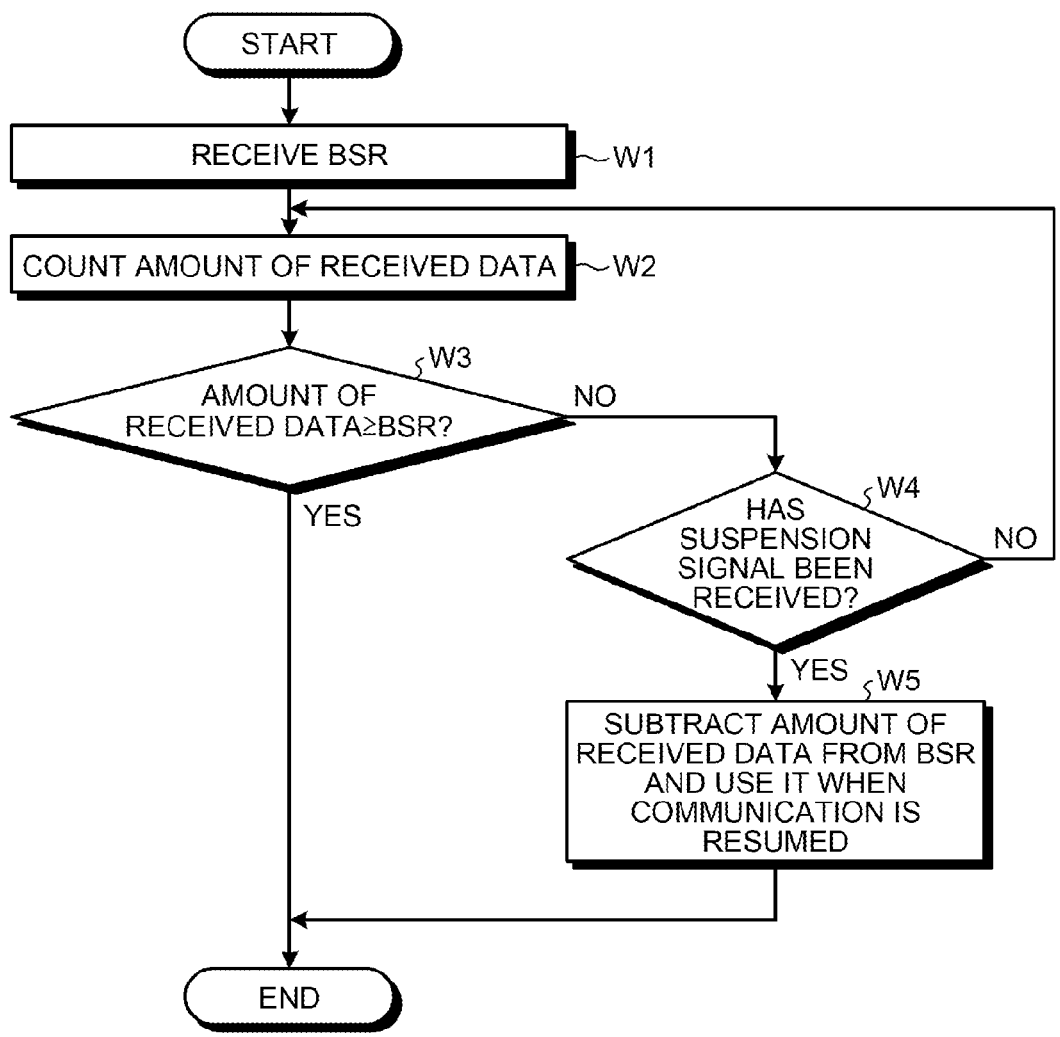
FIG. 12 is a flowchart illustrating the operation of the base station according to modification 1.

FIG. 12 is a flowchart illustrating the operation of the base station 10 according to modification 1. As illustrated in FIG. 12, after the base station 10 receives a BSR from the mobile station 20 (Step W1), when the base station 10 receives data, the base station 10 measures the amount of received data (Step W2). Then, the base station 10 compares the amount of received data with the BSR (Step W3). If the amount of received data is equal to or greater than the amount of data indicated by the BSR (the total amount of data to be sent) (Yes at Step W3), the base station 10 ends the process assuming that all of the data has been received.

In contrast, if the comparison result indicates that the amount of the received data is less than the amount of data indicated by the BSR (No at Step W3), when the base station 10 receives a suspension signal from the mobile station 20 (Yes at Step W4), the base station 10 moves to the process at Step W5 and the subsequent processes (Step W5), assuming that the communication has been suspended even though all of the data has not been received. At Step W5, the base station 10 subtracts the amount of received data that is received before the suspension from the amount of data that is indicated by the BSR received at Step W1 and then sets the subtraction result to a new BSR (the BSR that indicates the remaining amount of data) that is used when the communication is resumed. Furthermore, at Step W4, in a time period for which the suspension signal is not received from the mobile station 20 (No at Step W4), the base station 10 returns to Step W2 and continuously performs the process at Step W2 and the subsequent processes.

With the wireless communication system according to modification 1, instead of diverting the BSR, which is the same BSR as that received before the suspension of the communication, after the resumption of communication, the base station 10 updates the BSR at the time of the resumption of the communication by taking into consideration the amount of received data. Specifically, when the processor 12 in the base station 10 receives a suspension signal before the receiving unit 111 completes the reception of data by an amount indicated by the BSR that is reported from the mobile station, the processor 12 subtracts the amount of data that have already been received from the mobile station (amount of received data) from the amount indicated by the BSR. For example, if the mobile station 20 attempts to send 100 MB of data, the base station 10 receives a BSR that indicates 100 MB. Thereafter, if communication is suspended when the base station 10 completes the reception of data containing therein 40 MB sent from the mobile station 20, the amount of data indicated by the BSR when the communication is resumed is updated to 60 MB (=100 MB-40 MB), which is the amount of transmission data that has not yet been sent. Consequently, the wireless communication system 1 according to the first to the third embodiments can be used not only when the mobile station 20 re-sends the data at the beginning (0 MB) when the communication is resumed but also when the mobile station 20 sends data starting from the middle. Thus, by using modification 1, an advantage is provided in that, in addition to the advantage described in each of the embodiments, the wireless communication system 1 is more widely used.

Furthermore, in the fourth embodiment, because the base station 10 does not retain a BSR when communication is resumed, the base station 10 does not update the BSR; however, a new BSR is recalculated on the mobile station 20 side and then is sent (Step V7 illustrated in FIG. 10). For example, when the mobile station 20 attempts to send 100 MB of data, the mobile station 20 sends a BSR that indicates 100 MB before the mobile station 20 performs the data transmission (Step V3 illustrated in FIG. 10). If the communication is suspended when the mobile station 20 completes the sending of 40 MB of data, the mobile station 20 updates, at the time of the resumption of the communication, the amount of data of the BSR to 60 MB (=100 MB-40 MB), which corresponds to the amount of data that has not been sent, and then sends the BSR again (Step V7 illustrated in FIG. 10). Consequently, the base station 10 can use the updated BSR, which is received from the mobile station 20 as a substitution for the SR, without processing anything and thus the BSR (subtraction process) does not need to be calculated on the base station 10 side. As described above, similarly to the first to the third embodiments, the wireless communication system 1 according to the fourth embodiment may also be used when the mobile station 20 sends the remaining data starting from the middle. Consequently, the system is more widely used.

Furthermore, as for modification 2, in addition to the base station 10, the mobile station 20 may also measure the time period for which the base station 10 retains a BSR. FIG. 13 is a flowchart illustrating the operation of the mobile station 20 according to modification 2. As illustrated in FIG. 13, the mobile station 20 retains, in the memory 23, the predetermined time periods $T_1$ to $T_4$ and an elapsed time period $T_5$ since the BSR has been sent. After a suspension signal is sent (Step X1), if the communication with the base station 10 is resumed (Yes at Step X2), the mobile station 20 attempts to send an SR for data transmission. At this point, the mobile station 20 refers to the elapsed time period $T_5$ in the memory 23 and determines whether the time when the SR is sent is before the elapsed time period $T_5$ has elapsed (Step X3).

After the determination, if it is determined that the SR is sent before the elapsed time period $T_5$ (Yes at Step X3), the mobile station 20 determines that the base station 10 still retains the BSR and then skips the process of transmitting the BSR. Specifically, after the mobile station 20 receives, from the base station 10, a Grant with respect to the SR that is performed at Step X3 (Step X4), the mobile station 20 performs data transmission to the base station 10 by using the resources allocated for the data transmission (Step X5). In contrast, after the determination performed at Step X3, if it is determined that the SR is sent after the elapsed time period $T_5$ (No at Step X3), the mobile station 20 determines that the base station 10 has not retained the BSR (determines that the BSR has already been discarded), and thus the mobile station 20 sends the BSR as usual. Specifically, after the mobile station 20 receives, from the base station 10, the Grant with respect to the SR that is performed at Step X3 (Step X6), the mobile station 20 sends the BSR (Step X7). Then, the mobile station 20 receives a Grant with respect to the BSR from the base station 10 (Step X8) and then performs, by using the allocated resources, data transmission to the base station 10 (Step X9).

As described above, with the wireless communication system according to the modification 2, the mobile station 20 includes the processor 22 that measures the time period for which the base station 10 retains the amount of data indicated by the BSR. With this method, because the mobile station 20 checks the predetermined time periods $T_1$ to $T_4$ against the elapsed time period $T_5$ since the BSR has been sent, the mobile station 20 can also obtain whether the base station 10 retains the BSR. Specifically, if the elapsed time period $T_5$ reaches one of the predetermined time periods $T_1$ to $T_4$, the mobile station 20 determines that the base station 10 has discarded the BSR of the mobile station 20. Consequently, after the SR has been sent, the mobile station 20 can easily determine whether a BSR has been sent to the base station 10. Thus, an existing BSR can be diverted by the base station 10. This makes it possible to avoid the state in which a BSR is also sent even when a new BSR does not need to be acquired. Consequently, the delay time due to transmission of a BSR can be reduced and, furthermore, the resources can be saved.

Furthermore, modification 2 described above may also be used for the first to the fourth embodiments and modification 1. However, when modification 2 is used for the second embodiment, if the elapsed time period $T_5$ reaches one of the predetermined time periods $T_1$ to $T_4$, the mobile station 20 inhibits a BSR discard request from being sent to the base station 10. This prevents the sending of a discard request with respect to the BSR that has already been discarded. Consequently, advantages are expected, such as a reduction in a delay time due to sending and receiving a discard request and saving of the resources. Thus, modification 2 is particularly effective in the second embodiment.

Furthermore, conventionally, when the mobile station 20 receives a Grant with respect to an SR to be sent, the mobile station 20 sends a BSR in response to the reception of the Grant (for example, Step S3 illustrated in FIG. 4). Consequently, also in the first to the third embodiments, due to the reception of a Grant in response to an SR that is sent after the communication is resumed (for example, Step S10 illustrated in FIG. 4), there is a concern that an unwanted BSR may possibly be sent to the base station 10. In order to eliminate such a concern, the mobile station 20 may also perform control such that the mobile station 20 does not send back any BSR with respect to the Grant (for example, Step S10 illustrated in FIG. 4) that is received immediately after the suspension signal (for example, Step S6 illustrated in FIG. 4) is sent, and instead, the mobile station 20 sends back, as usual, a BSR with respect to the Grant (for example, Step S2 illustrated in FIG. 4) that is other than the Grant that is received immediately after the suspension signal is sent. Furthermore, the concern may also be eliminated by allowing the base station 10 to include a signal indicating that a BSR is not needed in the Grant (for example, Step S10 illustrated in FIG. 4) with respect to the SR.

Furthermore, in the fourth embodiment, a case in which the mobile station 20 notifies, at a previously determined timing, the base station 10 of its own BSR is a case in which, the amount of data indicated by the BSR has not completely been sent (communication is suspended) via the resources specified by the second resource allocation information. However, a case in which the mobile station 20 notifies the base station 10 of the BSR of the mobile station 20 is not limited to the above case. For example, in the fourth embodiment, because the base station 10 does not continuously retain the received BSR, it is preferable to measure, on the mobile station 20 side, the elapsed time since the BSR has been sent. In such a case, a case in which the mobile station 20 notifies the base station 10 of the BSR of the mobile station 20, may also be a case in which the predetermined time period $T_4$ (see FIG. 10) has not elapsed since the mobile station 20 has sent the BSR.

Furthermore, the starting point of the predetermined time period $T_1$ (see FIG. 4) or the predetermined time period $T_2$ (see FIG. 8) described above is not limited to the reception of the BSR. Instead, the reception of data, the reception of a suspension signal, or the reception of an SR that is sent after the resumption of communication may also be used for the starting point. In particular, because the time point at which communication is resumed is used as the starting point of the predetermined time period $T_1$ or $T_2$, the base station 10 can retain the received BSR without receiving an effect of the suspension time of communication. Furthermore, the starting point of $T_4$ (see FIG. 10) is also not limited to the sending time of the BSR. Instead, the time at which data is sent or the time at which a suspension signal is sent may also be used.

In each of the embodiments described above, a suspension signal is arranged inside a PUSCH; however, the configuration is not limited thereto. For example, a suspension signal may also be arranged in another radio channel, such as a physical uplink control channel (PUCCH).

Furthermore, in each of the embodiments, a description has been given with the assumption that the mobile station is a mobile phone, a smart phone, or a personal digital assistant (PDA). However, the present invention is not limited to a mobile station. The present invention may also be used for various communication devices that send suspension signals. In particular, because a suspension request is sent at a timing desired by a mobile station (i.e., led by a mobile station), the present invention is effectively used for terminals in which suspension or resumption frequently occurs during communication, such as sensor nodes, machine type communication (MTC) terminals, ad hoc terminals, or multihop terminals.

Furthermore, the components of each unit in the base station 10 illustrated in FIG. 2 and in the mobile station 20 illustrated in FIGS. 3 and 7 are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the control signal demodulation decoding units 122 and 222 and the data signal demodulation decoding units 123 and 223, or the BSR discard request generating unit 232 and the BSR discard request encoding modulation unit 233 may also be integrated as a single unit. In contrast, each of the processors 12 and 22 may also be separated by dividing it into a unit that calculates a BSR or an elapsed time and a unit that retains the BSR or the elapsed time (memory). Furthermore, the memories 13 and 23 may also be external devices of the base station 10 and the mobile station 20 and connected via a network or a cable.

In the above, a description has been individually given of the configuration and the operation for each embodiment; however, the wireless communication system according to each of the embodiments may integrally includes the units specified in the other embodiments or modifications. Furthermore, the combination of the embodiments is not limited to two. For example, any combination, such as three or more combinations, may also be used. For example, as described in the third embodiment, the wireless communication system 1 according to the first embodiment may also protect an RBS-ID without releasing the RBS-ID even when a suspension signal. Furthermore, the wireless communication system according to modification 1 may also have a function, which is specified in modification 2, of checking the predetermined time periods $T_1$ to $T_4$ against the elapsed time period $T_5$ since a BSR has been sent. Furthermore, a single wireless communication system may also have all of the components described in the first to the fourth embodiments and modifications 1 and 2.

According to an aspect of an embodiment of the wireless communication system disclosed in the present invention, an advantage is provided in that it is possible to reduce transmission delay from a mobile station to a base station.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
a base station that sends, to a mobile station in accordance with a scheduling request sent from the mobile station, first resource allocation information and sends, to the mobile station based on a buffer status reported from the mobile station by using the first resource allocation information, second resource allocation information; and
the mobile station that sends, to the base station, data by using the second resource allocation information, wherein
the base station includes:
a first processor configured to execute a first process including:
receiving the data sent from the mobile station by using the second resource allocation information, and
performing control, when the scheduling request is received from the mobile station before the completion of the reception of the data by an amount indicated by the buffer status that is reported from the mobile station and before the amount indicated by the buffer status is discarded, such that the second resource allocation information is sent to the mobile station without sending the first resource allocation information, wherein
the mobile station includes a second processor configured to execute a second process including sending, to the base station, a suspension signal that notifies the base station of suspension of communication with the base station, and
when the first processor in the base station receives the suspension signal before the first processor in the base station completes the reception of the data by the amount indicated by the buffer status reported from the mobile station, the first processor subtracts an amount of data that has already been received from the mobile station from the amount indicated by the buffer status.

2. The wireless communication system according to claim 1, wherein the first processor discards, in accordance with an elapsed predetermined time period, information that indicates the buffer status reported from the mobile station.

3. The wireless communication system according to claim 1, wherein
the mobile station includes a second processor configured to execute a second process including sending, to the base station, a request that information that indicates the buffer status be discarded, and
the first processor in the base station discards, in accordance with the reception of the request, the information that indicates the buffer status reported from the mobile station.

4. The wireless communication system according to claim 1, wherein the mobile station includes a second processor configured to execute a second process including measuring a time period for which the base station retains the amount of data that is indicated by the buffer status.

5. A wireless communication system comprising:
a mobile station that sends, to a base station, a scheduling request at a predetermined timing, reports, to the base station, a buffer status of the mobile station by using first resource allocation information that is sent from the base station in accordance with the scheduling request, and sends, to the base station, data by using second resource allocation information that is sent from the base station based on the buffer status, wherein
the mobile station includes a first processor that performs control, when the sending of, by using resources specified by the second resource allocation information, the data by an amount indicated by the buffer status reported to the base station has not been completed, such that a buffer status of the mobile station is sent to the base station at the predetermined timing without sending the scheduling request, wherein
the base station includes:
a second processor configured to execute a process including:
  receiving the data sent from the mobile station by using the second resource allocation information, and
  performing control, when the scheduling request is received from the mobile station before the completion of the reception of the data by the amount indicated by the buffer status that is reported from the mobile station and before the amount indicated by the buffer status is discarded, such that the second resource allocation information is sent to the mobile station without sending the first resource allocation information, wherein
the mobile station includes the first processor configured to execute a first process including sending, to the base station, a suspension signal that notifies the base station of suspension of communication with the base station, and
when the second processor in the base station receives the suspension signal before the second processor in the base station completes the reception of the data by the amount indicated by the buffer status reported from the mobile station, the second processor subtracts an amount of data that has already been received from the mobile station from the amount indicated by the buffer status.

6. A base station comprising:
a radio frequency circuit;
a memory; and
a first processor configured to execute a first process including:
sending, to a mobile station in accordance with a scheduling request sent from the mobile station, first resource allocation information and sending, to the mobile station based on a buffer status reported from the mobile station by using the first resource allocation information, second resource allocation information that is used for data transmission sent from the mobile station, by way of the radio frequency circuit;
receiving data that is sent from the mobile station by using the second resource allocation information, by way of the radio frequency circuit, and storing the received data in the memory; and
performing control, when the scheduling request is received from the mobile station before the completion of the reception of the data by an amount indicated by the buffer status reported from the mobile station and before the amount indicated by the buffer status is discarded, such that the second resource allocation information is sent to the mobile station without sending the first resource allocation information, wherein
the mobile station includes a second processor configured to execute a second process including sending, to the base station, a suspension signal that notifies the base station of suspension of communication with the base station, and
when the first processor in the base station receives the suspension signal before the first processor in the base station completes the reception of the data by the amount indicated by the buffer status reported from the mobile station, the first processor subtracts an amount of data that has already been received from the mobile station from the amount indicated by the buffer status.

* * * * *